(12) United States Patent
Ihlefeld et al.

(10) Patent No.: US 12,456,466 B2
(45) Date of Patent: Oct. 28, 2025

(54) PERSONALIZED AND CURATED TRANSCRIPTION OF AUDITORY EXPERIENCES TO IMPROVE USER ENGAGEMENT

(71) Applicant: META PLATFORMS TECHNOLOGIES, LLC, Menlo Park, CA (US)

(72) Inventors: Antje Ihlefeld, Redmond, WA (US); Alexander Reich, Seattle, WA (US); Morteza Khaleghimeybodi, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 264 days.

(21) Appl. No.: 18/160,249

(22) Filed: Jan. 26, 2023

(65) Prior Publication Data

US 2024/0257812 A1 Aug. 1, 2024

(51) Int. Cl.
*G10L 15/26* (2006.01)
*G02B 27/01* (2006.01)
*G10L 25/51* (2013.01)

(52) U.S. Cl.
CPC ............ *G10L 15/26* (2013.01); *G02B 27/017* (2013.01); *G10L 25/51* (2013.01)

(58) Field of Classification Search
CPC ......... A61B 5/38; A61B 5/4803; A61B 5/163; G02B 27/017; G02B 3/14; G02B 30/56; G06F 1/163; G06F 3/011; G06F 3/013; G06F 3/015; G06F 3/016; G06F 3/167; G06F 40/30; G06F 40/35; G06F 16/58; G06N 5/04; G06N 3/0464; G06T 7/246; G06T 5/20; G06T 19/20; G06V 10/764; G06V 20/20; G06V 10/82; G06V 20/50; G06V 40/193; G08B 1/08; G09B 17/00; G09B 21/009; G09B 21/06; G10K 11/16; G10K 11/1754; G10L 13/08; G10L 15/22; G10L 15/24; G10L 15/26; G10L 21/02; G10L 25/51; G10L 25/60;
(Continued)

(56) References Cited

U.S. PATENT DOCUMENTS

| 4,489,387 | A * | 12/1984 | Lamb | G16H 70/20 |
|           |     |         |      | 709/204 |
| 8,050,914 | B2 * | 11/2011 | Schmidt | H04R 3/005 |
|           |     |         |      | 704/226 |

(Continued)

*Primary Examiner* — Gerald Gauthier
(74) *Attorney, Agent, or Firm* — Greenberg Traurig, LLP

(57) ABSTRACT

One embodiment of the present invention sets forth a technique for developing a curated transcription of an acoustic experience containing spoken words. The technique includes computing a first metric for a word based on biomarkers associated with the user, where the metric indicates an attentional state of a user perceiving the word during an auditory experience. The technique further includes computing a second metric corresponding to an intelligibility of the word during the auditory experience. The technique also includes computing a third metric corresponding to an importance of the word in a context of other proximate words during the auditory experience. Based on a weighting assigned to each of the first, second and third metric, the technique includes determining whether to transcribe the word on a display.

20 Claims, 5 Drawing Sheets

(58) Field of Classification Search
CPC . G10L 2015/227; G10L 19/008; G16H 70/20; G16H 70/40; H04L 51/02; H04L 67/535; H04M 3/2227; H04N 21/4828; H04N 21/4884; H04N 7/157; H04N 13/383; H04N 21/42203; H04N 21/4394; H04R 3/005; H04S 7/30; G11B 27/34
See application file for complete search history.

(56) References Cited

U.S. PATENT DOCUMENTS

| | | | | |
|---|---|---|---|---|
| 8,620,674 | B2* | 12/2013 | Thumpudi | G10L 19/008 704/200 |
| 8,655,440 | B2* | 2/2014 | Adachi | A61B 5/38 704/200 |
| 9,031,838 | B1* | 5/2015 | Nash | H04M 3/2227 704/226 |
| 11,735,207 | B1* | 8/2023 | Venkataraman | G10L 15/26 704/200 |
| 11,854,566 | B2* | 12/2023 | Leider | G06F 3/011 |
| 2006/0181607 | A1* | 8/2006 | McNelley | G02B 30/56 348/E7.083 |
| 2012/0032874 | A1* | 2/2012 | Mukawa | G02B 3/14 345/8 |
| 2013/0088489 | A1* | 4/2013 | Schmeitz | G06T 5/20 345/419 |
| 2014/0189016 | A1* | 7/2014 | Goldsmith | H04L 67/535 709/205 |
| 2014/0198193 | A1* | 7/2014 | Yamamoto | G02B 27/017 348/54 |
| 2014/0253437 | A1* | 9/2014 | Vaught | G02B 27/017 345/156 |
| 2017/0155868 | A1* | 6/2017 | Wilairat | H04N 21/4884 |
| 2019/0023377 | A1* | 1/2019 | Henderson | A61B 5/163 |
| 2019/0228757 | A1* | 7/2019 | Chwioko | G10K 11/1754 |
| 2020/0021796 | A1* | 1/2020 | Russell | H04N 13/383 |
| 2020/0097076 | A1* | 3/2020 | Alcaide | G06F 3/016 |
| 2020/0126545 | A1* | 4/2020 | Kakkar | G06V 10/764 |
| 2020/0134295 | A1* | 4/2020 | el Kaliouby | G06V 10/82 |
| 2020/0135166 | A1* | 4/2020 | Wiles | G10K 11/16 |
| 2020/0311347 | A1* | 10/2020 | Theobald | G06F 40/35 |
| 2020/0327432 | A1* | 10/2020 | Doebelin | G06N 5/04 |
| 2020/0380952 | A1* | 12/2020 | Zhang | G10L 13/08 |
| 2021/0019371 | A1* | 1/2021 | Saha | G06F 40/30 |
| 2021/0089124 | A1* | 3/2021 | Manjunath | G06V 20/20 |
| 2022/0199079 | A1* | 6/2022 | Hanson | H04L 51/02 |
| 2022/0301563 | A1* | 9/2022 | Chang | G10L 15/24 |
| 2022/0343608 | A1* | 10/2022 | Aleem | G06N 3/0464 |
| 2022/0357794 | A1* | 11/2022 | Aleem | G06T 19/20 |
| 2022/0375315 | A1* | 11/2022 | Faaborg | G08B 1/08 |
| 2023/0010466 | A1* | 1/2023 | Port | H04S 7/30 |
| 2023/0051409 | A1* | 2/2023 | Du | H04N 7/157 |
| 2023/0315385 | A1* | 10/2023 | Akmal | G06F 3/167 715/727 |
| 2023/0419982 | A1* | 12/2023 | Travaglini | G10L 21/02 |
| 2024/0057936 | A1* | 2/2024 | Strahm | A61B 5/4803 |
| 2024/0069366 | A1* | 2/2024 | Andoche | G06V 40/193 |
| 2024/0087345 | A1* | 3/2024 | Estrada Diaz | G06V 20/50 |
| 2024/0203604 | A1* | 6/2024 | Singh | G16H 70/40 |
| 2024/0257812 | A1* | 8/2024 | Ihlefeld | G10L 15/26 |
| 2024/0330362 | A1* | 10/2024 | Du | G06F 16/58 |
| 2024/0428492 | A1* | 12/2024 | Navarro | G06T 7/246 |
| 2025/0061895 | A1* | 2/2025 | Aher | H04N 21/4828 |

* cited by examiner

PERSONALIZED AND CURATED TRANSCRIPTION OF AUDITORY EXPERIENCES TO IMPROVE USER ENGAGEMENT

BACKGROUND

Field of the Various Embodiments

Various embodiments relate generally to speech-to-text transcription, and, more specifically, to techniques for providing a personalized and curated speech-to-text transcription of auditory experiences to improve user engagement.

Description of the Related Art

Speech-to-text systems often recognize spoken words in a speech-based auditory experience (e.g., a speech, a conversation, an audiobook, music lyrics, a movie, etc.) and produce a textual output containing all the spoken words that the system is able to recognize. Users engaged with and listening to the speech-based auditory experience, however, may not need a transcription of all the spoken words to follow along. For users who may be momentarily distracted or do not comprehend a portion of the conversation, access to just a few keywords that were missed may be sufficient to catch up with what is being discussed. In fact, for some users, providing a transcript of an entire conversation may cause them to disengage from the auditory experience. Further, providing a verbatim transcript of the conversation can be frustrating for users because inundating the user with text limits cognitive access to body language or lip-reading cues, which has the effect of reducing a sense of auditory presence as well as social connection.

In dual-task situations, which are becoming increasingly prevalent, providing a verbatim transcription can also be excessive. For example, in a situation where the transcription of an audiobook is presented on a near-eye display (NED) system (e.g. smart glasses) while the user is out for a walk or driving, a verbatim transcription of the audiobook can clutter the display and distract the user. Even in single-task circumstances, a verbatim transcription can be unappealing. For example, in a situation where the user is attempting to engage with a classroom lecture but experiencing difficulty focusing, information clutter on the NED can contribute to a further loss of focus.

Speech-to-text systems are also further limited by the fact that cognitive allocation of visual attention to the transcript of all the spoken words produced by such systems will reduce the remaining bandwidth for any other sensory cues. Transcriptions produced by such systems can, therefore, have the unintended consequence of disengaging certain users from other sensorial aspects of an experience (e.g., a user distracted by the transcription of the dialogue in a movie presented on a display for a NED may be disengaged from the visual experience of the movie). Moreover, users can differ dramatically in their susceptibility to visual clutter and, therefore, any standardized approaches to transcribing auditory experiences provided by conventional speech-to-text systems that do not take into account a subjective experience of a user is insufficient to boost user engagement. Additionally, selective transcriptions have not been successful because users differ dramatically in their ability to focus, and it is challenging for any speech-to-text system to determine what information to present. Furthermore, generalized solutions do not evaluate context of the speech and, accordingly, risk critical information being missed.

As the foregoing illustrates, what is needed in the art is a more effective approach to transcribing auditory experiences.

SUMMARY

One embodiment of the present invention sets forth a technique for developing a curated transcription of an acoustic experience containing spoken words. The technique includes computing a first metric for a word based on biomarkers associated with the user, where the metric indicates an attentional state of a user perceiving the word during the acoustic experience. The technique further includes computing a second metric corresponding to an intelligibility of the word during the acoustic experience. The technique also includes computing a third metric corresponding to an importance of the word in a context of other proximate words during the acoustic experience. Based on a weighting assigned to each of the first, second and third metric, the technique includes computing a fourth metric. Additionally, the technique includes determining whether to transcribe the word for display on a display based on the fourth metric.

Other embodiments of the present disclosure include, without limitation, a computer-readable medium including instructions for performing one or more aspects of the disclosed techniques as well as a computing device for performing one or more aspects of the disclosed techniques.

At least one advantage of the disclosed techniques is that users of the personalized speech-to-text transcription system can rely on the curated transcription to grasp certain spoken words during an auditory experience that were not perceived auditorily by the user. By personalizing and curating the transcription based on cues and biomarkers gathered from both the spoken words and the user, the transcription system not only improves user engagement, it also prevents the user from getting overwhelmed by a verbatim transcription of the auditory experience and the concomitant visual clutter. By relying on cues from the user (e.g., physiological cues to determine the user's attentional state), the transcription is also selectively curated for each individual user, which further improves user engagement. User engagement hinges on rapid task switching between real-time audio perception and visual perception. A selective display of keywords can help to keep the reading effort for users as low as possible while still providing enough information to generate context. For these reasons, the disclosed techniques represent a technological advancement compared to prior approaches that transcribe speech verbatim resulting in low user engagement.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
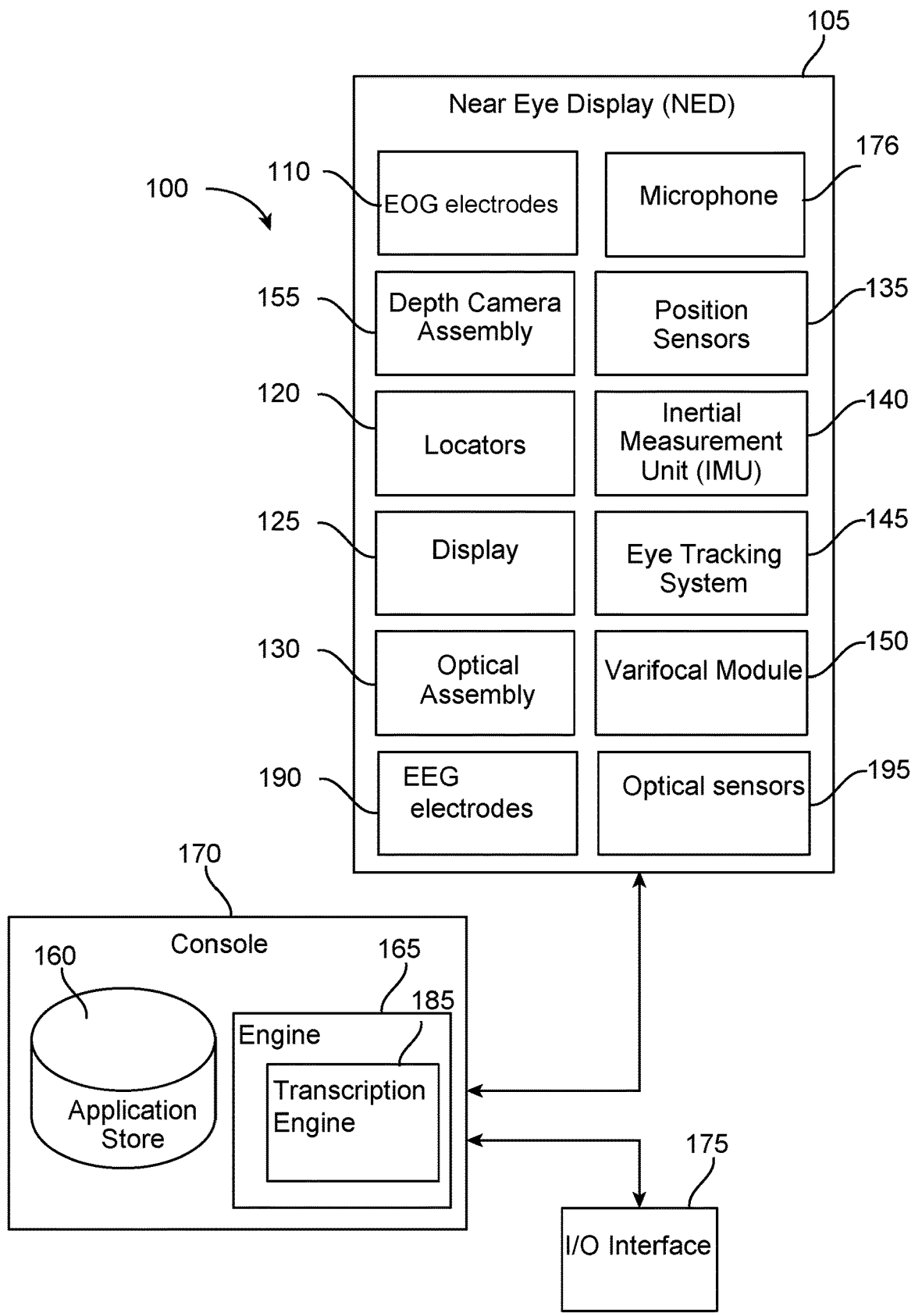
FIG. 1 is a block diagram of an embodiment of a near-eye display (NED) system in which a console operates, according to various embodiments.

In the following description, numerous specific details are set forth to provide a more thorough understanding of the various embodiments. However, it will be apparent to one of skilled in the art that the inventive concepts may be practiced without one or more of these specific details.

Overview

As noted above, conventional speech-to-text systems typically produce a transcription of all the spoken words of a conversation, which may not be ideal for users who are engaged with the conversation but are not able to grasp certain words as a result of being temporarily distracted or because certain words in the conversation are unintelligible. Providing a user with an entire transcript of a conversation on a display (especially in the case of near-eye display (NED) systems such as smart glasses) is not ideal because it can place an increased cognitive load on the user and potentially distract the user further from the auditory experience. Consequently, conventional speech-to-text systems are not able to engage users effectively.

To address these issues, various embodiments include a transcription engine configured to intelligently allocate cognitive load across the visual and auditory domains by providing a personalized and curated transcription of an auditory experience (e.g., a conversation) to a user on a display screen (e.g., on a display for a NED). The transcription shows only those keywords on the display that are determined to be relevant to a user while omitting or de-emphasizing words that are not determined to be relevant. Relevancy can be determined based on a combination of one or more of the following factors: a) a determination of how intelligible a particular spoken word is for a user (e.g., using an audibility estimation method such as the speech intelligibility index); b) an estimation of the importance of the word in the context of the conversation (e.g., using a machine learning model); and c) a determination of the user's attentional state using a variety of biomarkers (e.g., (i) estimation of blink rate, pupil dilation, gaze steadiness and gaze acceleration obtained from sensors positioned on the NED or on a user's face); (ii) EEG signals estimating the strength and/or fluctuations of a user's alpha and theta waves obtained using sensors disposed on the NED or placed on the user's head or in the user's ears). In some embodiments, a user is allowed to control the weight to be assigned to each of the factors (a), (b) and (c).

At least one advantage of the disclosed techniques is that users of the personalized speech-to-text transcription system can rely on the curated transcription to grasp certain spoken words during an auditory experience that were not perceived auditorily by the user. By personalizing and curating the transcription based on physiological cues and other biomarkers gathered from both the spoken words and the user, the transcription system not only improves user engagement, it also prevents the user from getting overwhelmed by a verbatim transcription of the auditory experience. By relying on cues or biomarkers from the user (e.g., physiological cues to determine the user's attentional state), the transcription is also selectively curated for each individual user, which further improves user engagement. Accordingly, the disclosed techniques represent a technological advancement compared to prior approaches that transcribe conversations in their entirety resulting in low user engagement.

The Artificial Reality System

Embodiments of the disclosure may include or be implemented in conjunction with an artificial reality system. Artificial reality is a form of reality that has been adjusted in some manner before presentation to a user, which may include, for example, a virtual reality (VR) system, an augmented reality (AR) system, a mixed reality (MR) system, a hybrid reality system, or some combination and/or derivatives thereof. Artificial reality content may include, without limitation, completely generated content or generated content combined with captured (e.g., real-world) content. The artificial reality content may include, without limitation, video, audio, haptic feedback, or some combination thereof. The artificial reality content may be presented in a single channel or in multiple channels (such as stereo video that produces a three-dimensional effect to the viewer). Additionally, in some embodiments, artificial reality systems may also be associated with applications, products, accessories, services, or some combination thereof, that are used to, e.g., create content in an artificial reality system and/or are otherwise used in (e.g., perform activities in) an artificial reality system. The artificial reality system may be implemented on various platforms, including a wearable head-mounted display (HMD) connected to a host computer system, a standalone HMD, a mobile device or computing system, or any other hardware platform capable of providing artificial reality content to one or more viewers.

It should be noted that although NEDs and head mounted displays (HMDs) are disclosed herein as reference examples, the transcription engine disclosed herein can also operate on other types of wearable and non-wearable display elements and display devices including, for example, display elements and devices that can be configured for placement in proximity of an eye or eyes of the user at a fixed location, without being head-mounted (e.g., the display device may be mounted in a vehicle, such as a car or an airplane, for placement in front of an eye or eyes of the user). Further, embodiments of the disclosure are not limited to being implemented in conjunction with artificial reality systems and can also be implemented with other types of audiovisual systems.

FIG. 1 is a block diagram of an embodiment of a near-eye display (NED) system 100 in which a console operates, according to various embodiments. The NED system 100 may operate in a virtual reality (VR) system environment, an augmented reality (AR) system environment, a mixed reality (MR) system environment, or some combination thereof. The NED system 100 shown in FIG. 1 comprises a NED 105 and an input/output (I/O) interface 175 that is coupled to the console 170. In various embodiments, the composite display system 100 is included in or operates in conjunction with NED 105. For example, the composite display system 100 may be included within NED 105 or may be coupled to the console 170 and/or the NED 105.

While FIG. 1 shows an example NED system 100 including one NED 105 and one I/O interface 175, in other embodiments any number of these components may be included in the NED system 100. For example, there may be multiple NEDs 105, and each NED 105 has an associated I/O interface 175. Each NED 105 and I/O interface 175 communicates with the console 170. In alternative configurations, different and/or additional components may be included in the NED system 100. Additionally, various components included within the NED 105, the console 170, and the I/O interface 175 may be distributed in a different manner than is described in conjunction with FIGS. 1-2B in some embodiments. For example, some or all of the functionality of the console 170 may be provided by the NED 105 and vice versa.

The NED 105 may be a head-mounted display that presents content to a user. The content may include virtual and/or augmented views of a physical, real-world environment including computer-generated elements (e.g., two-dimensional or three-dimensional images, two-dimensional or three-dimensional video, sound, etc.). In some embodiments, the NED 105 may also present audio content to a user. The NED 105 and/or the console 170 may transmit the audio content to an external device via the I/O interface 175. The external device may include various forms of speaker systems and/or headphones. In various embodiments, the audio content is synchronized with visual content being displayed by the NED 105. In some embodiments, the visual content includes a transcription of the audio content captured using a microphone 176 included with the NED 105 to aid the user in comprehending the audio content.

The NED 105 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other.

As shown in FIG. 1, the NED 105 may include EOG electrodes 110, a microphone 176, a depth camera assembly (DCA) 155, one or more locators 120, a display 125, an optical assembly 130, one or more position sensors 135, an inertial measurement unit (IMU) 140, an eye tracking system 145, EEG electrodes 190, optical sensors 195 and a varifocal module 150. In some embodiments, the display 125 and the optical assembly 130 can be integrated together into a projection assembly. Various embodiments of the NED 105 may have additional, fewer, or different components than those listed above. Additionally, the functionality of each component may be partially or completely encompassed by the functionality of one or more other components in various embodiments.

The DCA 155 captures sensor data describing depth information of an area surrounding the NED 105. The sensor data may be generated by one or a combination of depth imaging techniques, such as triangulation, structured light imaging, time-of-flight imaging, stereo imaging, laser scan, and so forth. The DCA 155 can compute various depth properties of the area surrounding the NED 105 using the sensor data. Additionally or alternatively, the DCA 155 may transmit the sensor data to the console 170 for processing. Further, in various embodiments, the DCA 155 captures or samples sensor data at different times. For example, the DCA 155 could sample sensor data at different times within a time window to obtain sensor data along a time dimension.

The DCA 155 includes an illumination source, an imaging device, and a controller. The illumination source emits light onto an area surrounding the NED 105. In an embodiment, the emitted light is structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (such as edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light in the environment surrounding NED 105, in addition to light reflected off of objects in the environment that is generated by the plurality of emitters. In various embodiments, the imaging device may be an infrared camera or a camera configured to operate in a visible spectrum. The controller coordinates how the illumination source emits light and how the imaging device captures light. For example, the controller may determine a brightness of the emitted light. In some embodiments, the controller also analyzes detected light to detect objects in the environment and position information related to those objects.

The locators 120 are objects located in specific positions on the NED 105 relative to one another and relative to a specific reference point on the NED 105. A locator 120 may be a light emitting diode (LED), a corner cube reflector, a reflective marker, a type of light source that contrasts with an environment in which the NED 105 operates, or some combination thereof. In embodiments where the locators 120 are active (i.e., an LED or other type of light emitting device), the locators 120 may emit light in the visible band (~380 nm to 950 nm), in the infrared (IR) band (~950 nm to 9700 nm), in the ultraviolet band (70 nm to 380 nm), some other portion of the electromagnetic spectrum, or some combination thereof.

In some embodiments, the locators 120 are located beneath an outer surface of the NED 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the NED 105 are opaque in the visible band of wavelengths of light. Thus, the locators 120 may emit light in the IR band under an outer surface that is transparent in the IR band but opaque in the visible band.

The display 125 displays two-dimensional or three-dimensional images to the user in accordance with pixel data received from the console 170 and/or one or more other sources. In various embodiments, the display 125 comprises a single display or multiple displays (e.g., separate displays for each eye of a user). In some embodiments, the display 125 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, other types of displays, a scanner, a one-dimensional array, and so forth. In addition, combinations of the display types may be incorporated in display 125 and used separately, in parallel, and/or in combination.

The optical assembly 130 magnifies image light received from the display 125, corrects optical errors associated with the image light, and presents the corrected image light to a user of the NED 105. The optical assembly 130 includes a plurality of optical elements. For example, one or more of the following optical elements may be included in the optical assembly 130: an aperture, a Fresnel lens, a convex lens, a concave lens, a filter, a reflecting surface, or any other suitable optical element that deflects, reflects, refracts, and/or in some way alters image light. Moreover, the optical assembly 130 may include combinations of different optical elements. In some embodiments, one or more of the optical elements in the optical assembly 130 may have one or more coatings, such as partially reflective or antireflective coatings.

In some embodiments, the optical assembly 130 may be designed to correct one or more types of optical errors. Examples of optical errors include barrel or pincushion distortions, longitudinal chromatic aberrations, or transverse chromatic aberrations. Other types of optical errors may further include spherical aberrations, chromatic aberrations or errors due to the lens field curvature, astigmatisms, in addition to other types of optical errors. In some embodiments, visual content transmitted to the display 125 is pre-distorted, and the optical assembly 130 corrects the distortion as image light from the display 125 passes through various optical elements of the optical assembly 130. In some embodiments, optical elements of the optical assembly 130 are integrated into the display 125 as a projection assembly that includes at least one waveguide coupled with one or more optical elements.

The microphone 176 captures audio content. In some embodiments, an array of microphones 176 can also be used, where the various microphones are necessary to achieve beamforming and direction of arrivals (DOA). The microphone 176 is able to receive sound from the user's or any other person's spoken voice. The microphone may be connected to the console 170 using Bluetooth® or any other type of wireless or wired technology. In some embodiments, a user can speak commands into the microphone that are executed by the console 170 to perform a certain action. In some embodiments, the input into the microphone from either the user's voice or an external sound can be transcribed using the transcription engine 185 in the console 170 and displayed on the display 125.

The IMU 140 is an electronic device that generates data indicating a position of the NED 105 based on measurement signals received from one or more of the position sensors 135 and from depth information received from the DCA 155. In some embodiments of the NED 105, the IMU 140 may be a dedicated hardware component. In other embodiments, the IMU 140 may be a software component implemented in one or more processors.

In operation, a position sensor 135 generates one or more measurement signals in response to a motion of the NED 105. Examples of position sensors 135 include: one or more accelerometers, one or more gyroscopes, one or more magnetometers, one or more altimeters, one or more inclinometers, and/or various types of sensors for motion detection, drift detection, and/or error detection. The position sensors 135 may be located external to the IMU 140, internal to the IMU 140, or some combination thereof.

Based on the one or more measurement signals from one or more position sensors 135, the IMU 140 generates data indicating an estimated current position of the NED 105 relative to an initial position of the NED 105. For example, the position sensors 135 include multiple accelerometers to measure translational motion (forward/back, up/down, left/right) and multiple gyroscopes to measure rotational motion (e.g., pitch, yaw, and roll). In some embodiments, the IMU 140 rapidly samples the measurement signals and calculates the estimated current position of the NED 105 from the sampled data. For example, the IMU 140 integrates the measurement signals received from the accelerometers over time to estimate a velocity vector and integrates the velocity vector over time to determine an estimated current position of a reference point on the NED 105. Alternatively, the IMU 140 provides the sampled measurement signals to the console 170, which analyzes the sample data to determine one or more measurement errors. The console 170 may further transmit one or more of control signals and/or measurement errors to the IMU 140 to configure the IMU 140 to correct and/or reduce one or more measurement errors (e.g., drift errors). The reference point is a point that may be used to describe the position of the NED 105. The reference point may generally be defined as a point in space or a position related to a position and/or orientation of the NED 105.

In various embodiments, the IMU 140 receives one or more parameters from the console 170. The one or more parameters are used to maintain tracking of the NED 105. Based on a received parameter, the IMU 140 may adjust one or more IMU parameters (e.g., a sample rate). In some embodiments, certain parameters cause the IMU 140 to update an initial position of the reference point so that it corresponds to a next position of the reference point. Updating the initial position of the reference point as the next calibrated position of the reference point helps reduce drift errors in detecting a current position estimate of the IMU 140.

In various embodiments, the eye tracking system 145 is integrated into the NED 105. The eye-tracking system 145 may comprise one or more illumination sources (e.g., infrared illumination source, visible light illumination source) and one or more imaging devices (e.g., one or more cameras). In operation, the eye tracking system 145 generates and analyzes tracking data related to a user's eyes as the user wears the NED 105. In various embodiments, the eye tracking system 145 estimates the angular orientation of the user's eye. The orientation of the eye corresponds to the direction of the user's gaze within the NED 105. The orientation of the user's eye is defined herein as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis is another axis of the eye that is defined as the axis passing through the center of the pupil and that is perpendicular to the corneal surface. The pupillary axis does not, in general, directly align with the foveal axis. Both axes intersect at the center of the pupil, but the orientation of the foveal axis is offset from the pupillary axis by approximately $-1°$ to $8°$ laterally and $+4°$ vertically. Because the foveal axis is defined according to the fovea, which is located in the back of the eye, the foveal axis can be difficult or impossible to detect directly in some eye tracking embodiments. Accordingly, in some embodiments, the orientation of the pupillary axis is detected and the foveal axis is estimated based on the detected pupillary axis.

In general, movement of an eye corresponds not only to an angular rotation of the eye, but also to a translation of the eye, a change in the torsion of the eye, and/or a change in shape of the eye. The eye tracking system 145 may also detect translation of the eye, i.e., a change in the position of the eye relative to the eye socket. In some embodiments, the translation of the eye is not detected directly, but is approximated based on a mapping from a detected angular orientation. Translation of the eye corresponding to a change in the eye's position relative to the detection components of the eye tracking unit may also be detected. Translation of this type may occur, for example, due to a shift in the position of the NED 105 on a user's head. The eye tracking system 145 may also detect the torsion of the eye, i.e., rotation of the eye about the pupillary axis. The eye tracking system 145 may use the detected torsion of the eye to estimate the orientation of the foveal axis from the pupillary axis. The eye tracking system 145 may also track a change in the shape of the eye, which may be approximated as a skew or scaling linear transform or a twisting distortion (e.g., due to torsional deformation). The eye tracking system 145 may estimate the foveal axis based on some combination of the angular orientation of the pupillary axis, the translation of the eye, the torsion of the eye, and the current shape of the eye.

As the orientation may be determined for both eyes of the user, the eye tracking system 145 is able to determine where the user is looking. The NED 105 can use the orientation of the eye to, e.g., determine an inter-pupillary distance (IPD) of the user, determine gaze direction, introduce depth cues (e.g., blur image outside of the user's main line of sight), collect heuristics on the user interaction in the VR media (e.g., time spent on any particular subject, object, or frame as a function of exposed stimuli), some other function that is based in part on the orientation of at least one of the user's eyes, or some combination thereof. Determining a direction of a user's gaze may include determining a point of convergence based on the determined orientations of the user's left and right eyes. A point of convergence may be the point that the two foveal axes of the user's eyes intersect (or the nearest point between the two axes). The direction of the user's gaze may be the direction of a line through the point of convergence and through the point halfway between the pupils of the user's eyes.

In some embodiments, the eye tracking systems can also be configured to estimate (measure) the user's blink rate, pupil dilation, gaze steadiness, gaze acceleration in addition to other eye-tracking cues or biomarkers. In some embodiments, the computations to determine the estimates can be conducted in real-time. In other embodiments, the estimates may be computed using recordings of the user's gaze. In some embodiments, the estimations regarding the user's blink rate and other eye-tracking biomarkers may be computed using electrooculography (EOG) electrodes 110, as will be explained further below. In some embodiments, the estimations regarding the user's blink rate and other eye-tracking biomarkers can be additionally determined or corroborated using optical sensors 195, as will also be explained below. In some embodiments, the EOG electrodes 110 and optical sensors 195 can all be comprised within the eye tracking system 145.

In some embodiments, the varifocal module 150 is integrated into the NED 105. The varifocal module 150 may be communicatively coupled to the eye tracking system 145 in order to enable the varifocal module 150 to receive eye tracking information from the eye tracking system 145. The varifocal module 150 may further modify the focus of image light emitted from the display 125 based on the eye tracking information received from the eye tracking system 145. Accordingly, the varifocal module 150 can reduce vergence-accommodation conflict that may be produced as the user's eyes resolve the image light. In various embodiments, the varifocal module 150 can be interfaced (e.g., either mechanically or electrically) with at least one optical element of the optical assembly 130.

In operation, the varifocal module 150 may adjust the position and/or orientation of one or more optical elements in the optical assembly 130 in order to adjust the focus of image light propagating through the optical assembly 130. In various embodiments, the varifocal module 150 may use eye tracking information obtained from the eye tracking system 145 to determine how to adjust one or more optical elements in the optical assembly 130. In some embodiments, the varifocal module 150 may perform foveated rendering of the image light based on the eye tracking information obtained from the eye tracking system 145 in order to adjust the resolution of the image light emitted by the display 125. In this case, the varifocal module 150 configures the display 125 to display a high pixel density in a foveal region of the user's eye-gaze and a low pixel density in other regions of the user's eye-gaze.

In some embodiments, physiological sensors such as electroencephalography (EEG) 190 and/or electrooculography (EOG) electrodes 110 can be used to determine the engagement of a user in different contexts and augment learning activities. The one or more EEG electrodes 190 capture electrical charges that result from activity in brain cells of the brain of the user. The one or more EEG electrodes 190 may use the principle of differential amplification by recording voltage differences between different points that compares one active exploring electrode site with another neighboring or distant reference electrode. The electrical signals captured by the EEG electrodes 190 may be used to generate EEG signal data defining a waveform over time that represents the electrical activity that is taking place within the brain of the user. In some embodiments, the EEG electrodes 190 can also be part of a group of electrodes that may be used to generate different types of electrograms of the brain, eye, heart, and the like (e.g., electroencephalography (EEG), electrocorticography (ECoG or iEEG), electrooculography (EOG), electroretinography (ERG), electrocardiogram (ECG)).

It should be noted that both EOG and EEG signals can be collected and captured using the same set of electrodes. The source of electrical activities originate from different locations (e.g., EOG signals result from the electrical activities from corneo-retinal standing potentials, and EEG signals result from brain's electrical activities), however, both EOG and EEG signals will typically be captured using the same sets of electrodes.

In some embodiments, the NED 105 comprise EEG electrodes 190. In some embodiments, the electrodes are disposed directly on the NED 105 (e.g., at the top of the pinnae, a contact point where the nose-pad meets the nose, on the temples or bridge of a pair of smart glasses as shown in FIG. 2B) where the electrodes come in contact with a user's anatomy when the user wears the NED. In other embodiments, the electrodes 190 are placed on a user's scalp, face or ears (e.g., in the user's ears using an in-ear device such that the electrodes contact an inner surface of the user's ear canal) and are communicatively coupled to the NED 105 through a wired or wireless medium.

Brain cells communicate via electrical impulses and are active all the time, even during sleep. The EEG signals measure brain waves of different frequencies within the brain. Brain waves are oscillating electrical voltages in the brain measuring just a few millionths of a volt. There are five widely recognized brain waves, and the main frequencies of human EEG waves are gamma, beta, alpha, theta and delta. The fluctuations in a user's brain waves typically provide information regarding a user's attentional state. In some embodiments, EEG recordings are used to compute the magnitude of fluctuations in the user's brain waves and derive conclusions regarding the user's attentional state based on these computations. In particular, the strength or dynamic range of the user's alpha, beta and theta brain waves and the fluctuations in these waves provide information regarding the user's attentional state and working memory capacity. In some embodiments, the EEG signals are used in conjunction with signals from the EOG electrodes 110 or other biomarkers from the eye tracking system 145 to filter for the user's attentional state.

EOG is a technique for measuring the corneo-retinal standing potential that exists between the front and the back of the human eye. EOG is primarily used to detect the movement of the eye. Using EOG sensors can help correlate eye movement artifact that occurs in EEG signals, and thus assist in the rejection of such eye movement artifacts. Blinking, for example, creates certain electrical activity that can distort the EEG signals. The artifacts in the EEG signal produced by blinking can mask information related to the user's attentional state. Accordingly, the EOG signals can, be used to remove any distortions from the EEG signals. Blink rate, as determined by the EOG sensors, can be used to remove distortions from the EEG signal and is also one of the biomarkers considered in determining the user's attentional state.

As noted above, in some embodiments, both EOG and EEG signals will be collected and captured using the same set of electrodes. It should further be noted that using a combination of eye-tracking imaging-based sensors (embedded in the NED system) and the EEG and EOG electrodes, trends can be obtained in the EEG data that correspond to the eye artifacts. Ultimately a neural network can be trained to collect correspondence between eye-tracking sensors and EOG signals captured from the electrodes within the glasses.

In some embodiments, the EOG electrodes 110 can be comprised within the eye tracking system 145. In some embodiments, the EOG readings can be derived from the same sensors as the EEG electrodes 190. In other embodiments, the EOG electrodes 110 may be distinct from the eye tracking system 145 and the EEG electrodes 190.

Similar to the EEG electrodes, in some embodiments, the EOG electrodes 110 are disposed directly on the NED 105 (e.g., on the temples or bridge of a pair of smart glasses) where the electrodes come in contact with a user's anatomy when the user wears the NED. In other embodiments, the EOG electrodes 110 are placed directly on a user's anatomy (e.g., on a user's face) and communicatively coupled to the NED 105 through a wired or wireless medium. In some embodiments, the user's blink rate is determined using the EOG electrodes 110.

In some embodiments, other optical sensors 195 are used to gather further information that is used to determine the user's attentional state. The information from the optical sensors can be useful in providing additional information regarding the user's attentional state particularly in instances where the EEG signal is heavily distorted, for example, because of the user's high blink rate. The optical sensors 195 can, in some embodiments, be disposed on the temples or bridge of the NED 105, or alternatively can be included in an in-ear device that is communicatively coupled to the NED 105.

In some embodiments, optical sensors 195 can include a functional near-infrared spectroscopy (fNIRS) system, which can comprise one or more emitting LEDs (sources) and one or more sensors (detectors). fNIRS is a non-intrusive and non-invasive optical brain imaging technique that estimates hemodynamic changes in the brain's cortex by shining light (from, e.g., a light emitting diode (LED), a laser, etc.) into the head of the user, and comparing light absorption across different wavelengths via the Beer-Lambert law principle. Unlike other tissue in the head, in neural tissue, hemodynamic changes in hemoglobin oxygenation (HbO) and hemoglobin deoxygenation (HbR) are constrained to be anti-correlated across time. Thus, since the oxygenation level changes as brain areas become more active, brain activity can be identified and monitored in real-time by detecting the changes in blood oxygenation represented by the HbO and/or HbR traces using an fNIRS device that includes a set of fNIRS optodes (e.g., sources, detectors).

When a user listens for sound in crowded environments, the background sound can make it difficult for the user to understand what people around the user are saying. The brain activity identified and monitored in real-time by the fNIRS device can be used to estimate both what the user is trying to hear and how much strain the user is experiencing in trying to hear what the user is focusing on (e.g., estimate how much difficulty the person experiences, estimate the cognitive load, estimate the listening effort, estimate listener's intent, and the like).

An fNIRS device can be applied to cortical regions of the brain that are more engaged with active listening as compared to a situation where a person passively hears sound. More specifically, the fNIRS device can be applied to a portion of the temporal lobe of the brain called superior temporal gyrus (STG) as well as portions of frontal cortex that are recruited for active listening. That is, cognitive load is thought to be related to the amount of blood oxygenation change in the STG. One way to access this signal is through fNIRS, that detects how much blood oxygenation changes as light is shined through the skull. Thus, an fNIRS device can be applied to measure activations near the STG that correlate with a listener's vulnerability to background sound and likely attributable to cognitive load (e.g., listening effort, listening fatigue), as opposed to just the percentage of words the listener can correctly understand (or not understand) despite being able to hear the words clearly.

The data obtained from fNIRS sensors can be used to estimate a cognitive load (e.g., listening effort, listener's intent, and the like) of the user. As noted above, fNIRS optodes, in some embodiments, be disposed on the temples or bridge of the NED 105, or alternatively can be included in an in-ear device that is communicatively coupled to the NED 105.

In some embodiments, the optical sensors 195 can include multi-wavelength photoplethysmography (MW-PPG) sensors. As would be familiar to one of skill in the art, PPG has been a commonly-used optical sensing method that collects light reflected or transmitted through skin so as to noninvasively monitor the pulsation of blood flow in subcutaneous blood vessels. Since blood flow pulsations can reflect the operating conditions of the circulatory and respiratory systems of the human body, PPG signals can be used as indicators, among other things, for a user's attentional state.

PPG sensors can, for example, be used to continuously measure a user's heart rate, respiratory rate, maximum VO2, energy expenditure, blood oxygen saturation SpO2, blood pressure, etc. Using the heart rate, respiratory rate and the user's oxygenation levels, additional estimates can be computed regarding the user's cognitive loads and efforts. In some embodiments, the optical sensors 195 are disposed directly on the NED 105 (e.g., on the temples for smart glasses, on the nose pad or bridge of the smart glasses) or communicatively coupled to the NED 105 using a wired or wireless medium (e.g., where the sensors need to be placed inside a user's ears using an in-ear device).

The I/O interface 175 facilitates the transfer of action requests from a user to the console 170. In addition, the I/O interface 175 facilitates the transfer of device feedback from the console 170 to the user. An action request is a request to perform a particular action. For example, an action request may be an instruction to start or end capture of image or video data or an instruction to perform a particular action within an application, such as pausing video playback, increasing or decreasing the volume of audio playback, initiating and pausing transcription of the audio, and so forth. In various embodiments, the I/O interface 175 may include one or more input devices. Example input devices include: a keyboard, a mouse, a game controller, a joystick, and/or any other suitable device for receiving action requests and communicating the action requests to the console 170. In some embodiments, the I/O interface 175 includes an IMU 140 that captures calibration data indicating an estimated current position of the I/O interface 175 relative to an initial position of the I/O interface 175.

In operation, the I/O interface 175 receives action requests from the user and transmits those action requests to the console 170. Responsive to receiving the action request, the console 170 performs a corresponding action. For example, responsive to receiving an action request, console 170 may configure I/O interface 175 to emit haptic feedback onto an arm of the user. For example, console 170 may configure I/O interface 175 to deliver haptic feedback to a user when an action request is received. Additionally or alternatively, the console 170 may configure the I/O interface 175 to generate haptic feedback when the console 170 performs an action, responsive to receiving an action request.

The console 170 provides content to the NED 105 for processing in accordance with information received from one or more of: the DCA 155, the eye tracking system 145, one or more other components of the NED 105, and the I/O interface 175. In the embodiment shown in FIG. 1, the console 170 includes an application store 160 and an engine 165. In the embodiment shown in FIG. 1, the engine 165 comprises a transcription engine 185. Various embodiments include a transcription engine 185 configured to intelligently allocate cognitive load across the visual and auditory domains by determining a personalized and curated transcription of a conversation to be displayed to a user on the display 125. The transcription generated by the transcription engine 185 and provided to the NED 105 includes words that are determined to be relevant where the relevancy of each word is decided based on a combination of factors as will be further discussed below.

In some embodiments, the console 170 may have additional, fewer, or different modules and/or components than those described in conjunction with FIG. 1. Similarly, the functions further described below may be distributed among components of the console 170 in a different manner than described in conjunction with FIG. 1.

The application store 160 stores one or more applications for execution by the console 170. An application is a group of instructions that, when executed by a processor, performs a particular set of functions, such as generating content for presentation to the user. For example, an application may generate content in response to receiving inputs from a user (e.g., via movement of the NED 105 as the user moves his/her head, via the I/O interface 175, etc.). Examples of applications include: gaming applications, conferencing applications, video playback applications, or other suitable applications.

In some embodiments, the engine 165 generates a three-dimensional mapping of the area surrounding the NED 105 (i.e., the "local area") based on information received from the NED 105. In some embodiments, the engine 165 determines depth information for the three-dimensional mapping of the local area based on depth data received from the NED 105. In various embodiments, the engine 165 uses depth data received from the NED 105 to update a model of the local area and to generate and/or modify media content based in part on the updated model of the local area.

The engine 165 also executes applications within the NED system 100 and receives position information, acceleration information, velocity information, predicted future positions, eye-gaze information, EEG/EOG information, information from fNIRS or PPG sensors, or some combination thereof, of the NED 105. Based on the received information, the engine 165 determines various forms of media content to transmit to the NED 105 for presentation to the user. For example, if the received information indicates that the user has looked to the left, the engine 165 generates media content for the NED 105 that mirrors the user's movement in a virtual environment or in an environment augmenting the local area with additional media content. Accordingly, the engine 165 may generate and/or modify media content (e.g., visual and/or audio content) for presentation to the user. The engine 165 may further transmit the media content to the NED 105. Additionally, in response to receiving an action request from the I/O interface 175, the engine 165 may perform an action within an application executing on the console 170. The engine 165 may further provide feedback when the action is performed. For example, the engine 165 may configure the NED 105 to generate visual and/or audio feedback and/or the I/O interface 175 to generate haptic feedback to the user.

In some embodiments, based on the eye tracking information (e.g., orientation of the user's eye) received from the eye tracking system 145, the engine 165 determines a resolution of the media content provided to the NED 105 for presentation to the user on the display 125. The engine 165 may adjust a resolution of the visual content provided to the NED 105 by configuring the display 125 to perform foveated rendering of the visual content, based at least in part on a direction of the user's gaze received from the eye tracking system 145. The engine 165 provides the content to the NED 105 having a high resolution on the display 125 in a foveal region of the user's gaze and a low resolution in other regions, thereby reducing the power consumption of the NED 105. In addition, using foveated rendering reduces a number of computing cycles used in rendering visual content without compromising the quality of the user's visual experience. In some embodiments, the engine 165 can further use the eye tracking information to adjust a focus of the image light emitted from the display 125 in order to reduce vergence-accommodation conflicts.

In some embodiments, based on the EEG signals from the electrodes 190, the blink rate, pupil dilation, gaze steadiness, and gaze acceleration information obtained from the eye tracking system 145, and further attentional information obtained from the various optical sensors 195, the transcription engine 185 determines a personalized and curated transcription of a conversation to be provided to NED 105 and displayed to a user on the display 125. Additionally, in order to generate the curated transcription or in response to receiving an action request from the I/O interface 175, the transcription engine may perform an action within an application executing on the console 170.

Figure 2A:
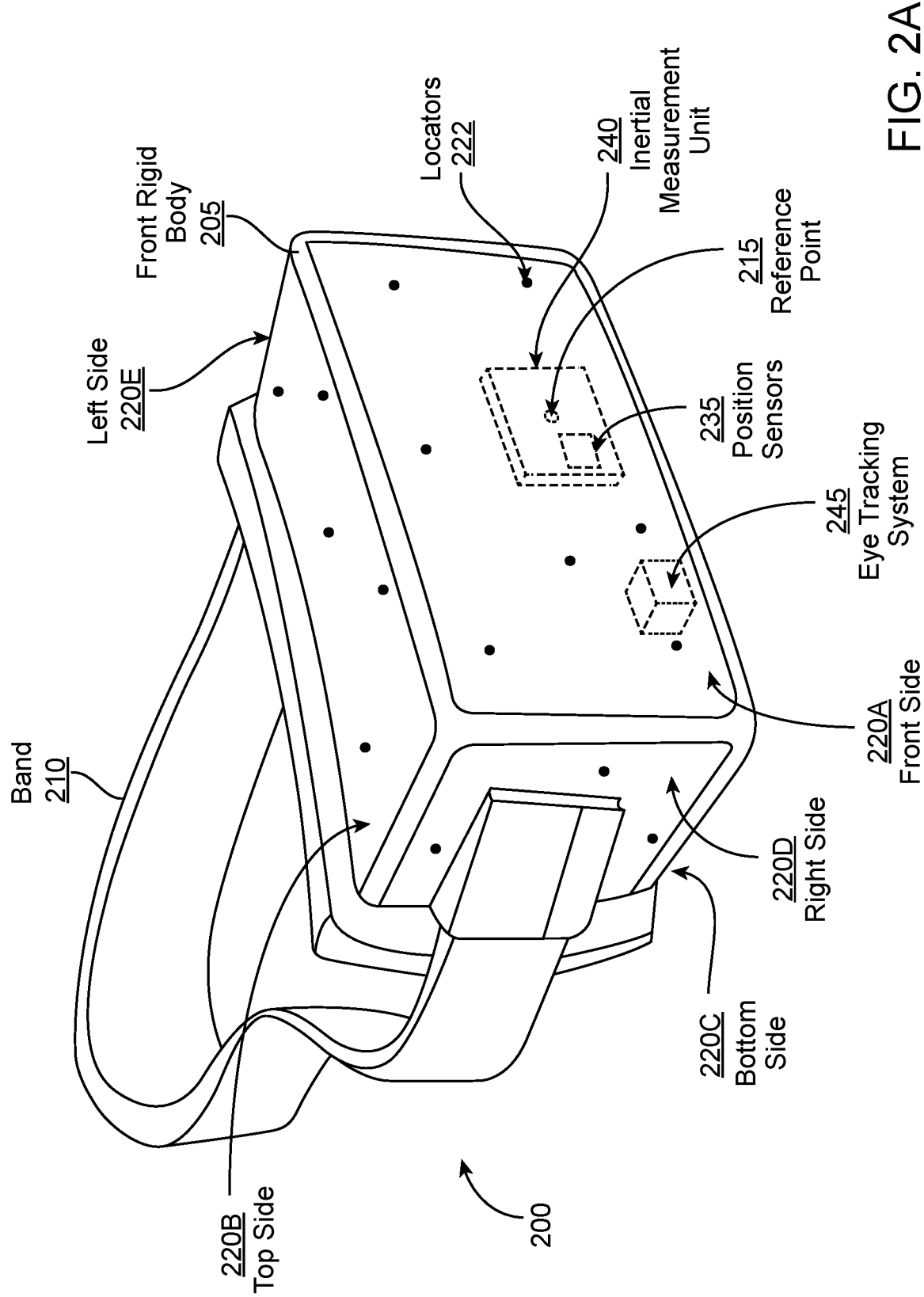
FIG. 2A is a diagram of an NED, according to various embodiments.
Figure 2B:
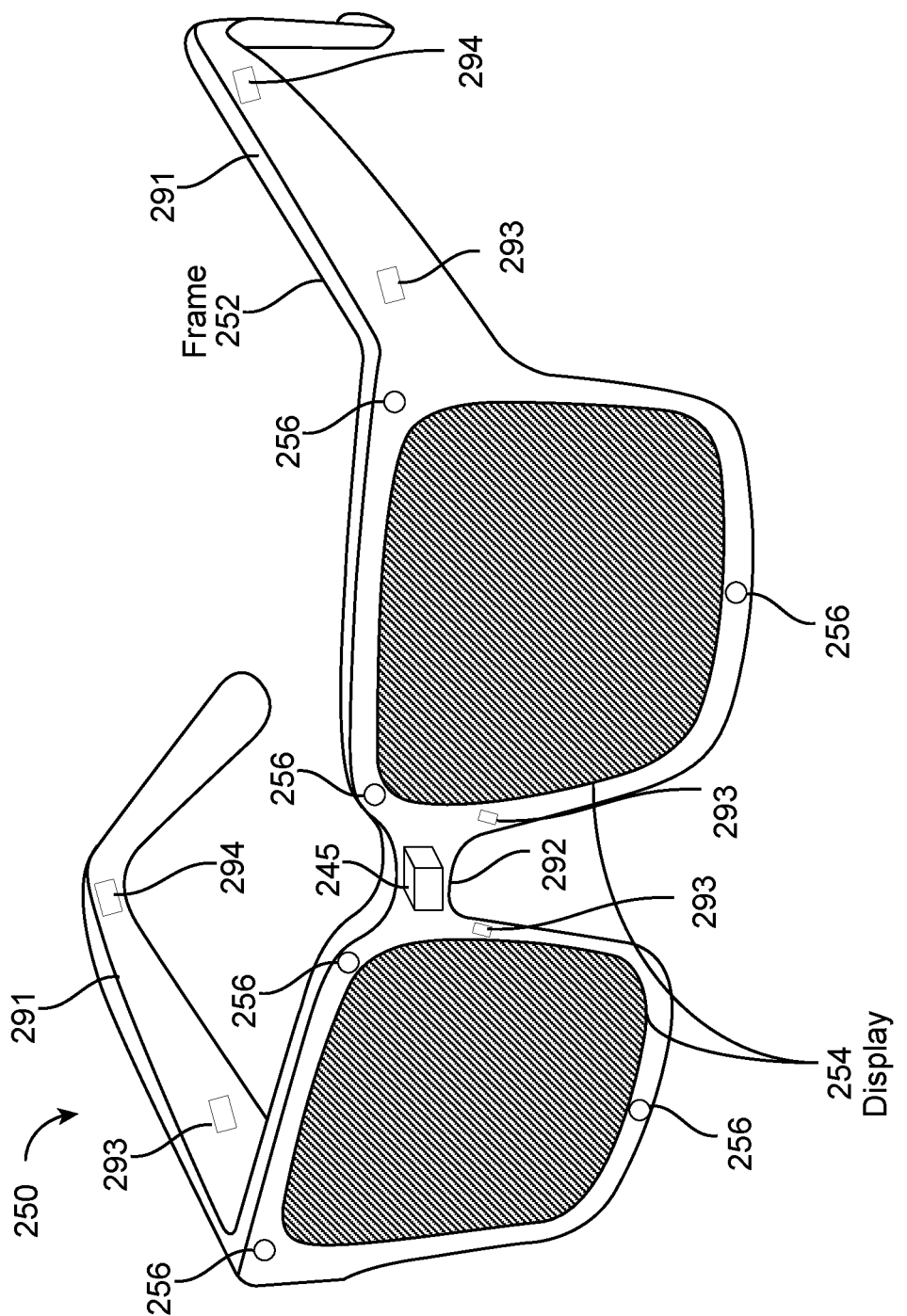
FIG. 2B is a diagram of an NED, according to various embodiments. In various embodiments, NED presents media to a user.

FIG. 2A is a diagram of an NED 200, according to various embodiments. In various embodiments, NED 200 presents media to a user. The media may include visual, auditory, and haptic content. In some embodiments, NED 200 provides artificial reality (e.g., virtual reality) content by providing a real-world environment and/or computer-generated content. In some embodiments, the computer-generated content may include visual, auditory, and haptic information.

Persons of ordinary skill in the art will understand that NED 200 may comprise a see-through NED. A see-through NED leave the user's view of the real world open and create either a transparent image or a small opaque image that blocks only a small portion of the user's peripheral vision. The see-through category typically comprises augmented reality headsets and smart glasses. Augmented reality headsets typically have a 20 to 60 degree field of view and overlay information and graphics on top of the user's view of the real world. Smart glasses typically have a smaller field of view and a display at which the user glances periodically rather than looking through the display continuously.

The NED 200 is an embodiment of the NED 105 and includes a front rigid body 205 and a band 210. The front rigid body 205 includes an electronic display element of the electronic display 125 (not shown in FIG. 2A), the optics assembly 130 (not shown in FIG. 2A), the IMU 240, the one or more position sensors 135, the eye tracking system 145, and the locators 120. In the embodiment shown by FIG. 2A, the position sensors 235 are located within the IMU 140, and neither the IMU 140 nor the position sensors 235 are visible to the user.

The locators 222 are located in fixed positions on the front rigid body 205 relative to one another and relative to a reference point 215. In the example of FIG. 2A, the reference point 215 is located at the center of the IMU 140. Each of the locators 222 emits light that is detectable by the imaging device in the DCA 155. The locators 222, or portions of the locators 222, are located on a front side 220A, a top side 220B, a bottom side 220C, a right side 220D, and a left side 220E of the front rigid body 205 in the example of FIG. 2A. In some embodiments, the EEG electrodes 190 and EOG electrodes 110 (not shown in FIG. 2A) and the optical sensors 195 (not shown in FIG. 2A) may be disposed at various locations on the front rigid body 205 or the front side 220A, the top side 220B, the bottom side 220C, the right side 220D, and the left side 220E of the front rigid body 205. Alternatively, in some embodiments, the sensors may be communicatively coupled to the NED 200 using wired or wireless technology.

The NED 200 includes the eye tracking system 245. As discussed above, the eye tracking system 245 may include a structured light generator that projects an interferometric structured light pattern onto the user's eye and a camera to detect the illuminated portion of the eye. The structured light generator and the camera may be located off the axis of the user's gaze. In various embodiments, the eye tracking system 245 may include, additionally or alternatively, one or more time-of-flight sensors and/or one or more stereo depth sensors. In FIG. 2A, the eye tracking system 245 is located below the axis of the user's gaze, although the eye tracking system 245 can alternately be placed elsewhere. Also, in some embodiments, there is at least one eye tracking unit for the left eye of the user and at least one tracking unit for the right eye of the user.

In various embodiments, the eye tracking system 245 includes one or more cameras on the inside of the NED 200. The camera(s) of the eye tracking system 245 may be directed inwards, toward one or both eyes of the user while the user is wearing the NED 200, so that the camera(s) may image the eye(s) and eye region(s) of the user wearing the NED 200. The camera(s) may be located off the axis of the user's gaze. In some embodiments, the eye tracking system 245 includes separate cameras for the left eye and the right eye (e.g., one or more cameras directed toward the left eye of the user and, separately, one or more cameras directed toward the right eye of the user).

FIG. 2B is a diagram of an NED 250, according to various embodiments. In various embodiments, NED 250 presents media to a user. The media may include visual, auditory, and haptic content. In some embodiments, NED 250 provides artificial reality (e.g., augmented reality) content by providing a real-world environment and/or computer-generated content. In some embodiments, the computer-generated content may include visual, auditory, and haptic information. The NED 250 is an embodiment of the NED 105. In one embodiment, the NED 250 includes see-through smart glasses.

NED 250 includes frame 252 and display 254. In various embodiments, the NED 250 may include one or more additional elements. Display 254 may be positioned at different locations on the NED 250 than the locations illustrated in FIG. 2B. Display 254 is configured to provide content to the user, including audiovisual content. In some embodiments, one or more displays 254 may be located within frame 252.

NED 250 further includes eye tracking system 245 and one or more corresponding modules 256. The modules 256 may include emitters (e.g., light emitters) and/or sensors (e.g., image sensors, cameras). In various embodiments, the modules 256 are arranged at various positions along the inner surface of the frame 252, so that the modules 256 are facing the eyes of a user wearing the NED 250. For example, the modules 256 could include emitters that emit structured light patterns onto the eyes and image sensors to capture images of the structured light pattern on the eyes. As another example, the modules 256 could include multiple time-of-flight sensors for directing light at the eyes and measuring the time of travel of the light at each pixel of the sensors. As a further example, the modules 256 could include multiple stereo depth sensors for capturing images of the eyes from different vantage points. In various embodiments, the modules 256 also include image sensors for capturing 2D images of the eyes.

In some embodiments, the EEG and/or EOG electrodes 293 may be disposed on the temple arms 291 of the NED 250 and/or on the nose pad 292 of the NED 250. EEG and/or EOG electrodes 293 perform substantially the same function as the EEG electrodes 190 and EOG electrodes 110 shown in FIG. 1. In some embodiments, other optical sensors 294 (e.g., fNIRS optodes) may be disposed on the temple arms 291 of the NED 250. Optical sensors 294 perform substantially the same function as the optical sensors 195 in FIG. 1.

Transcription Engine

Figure 3:
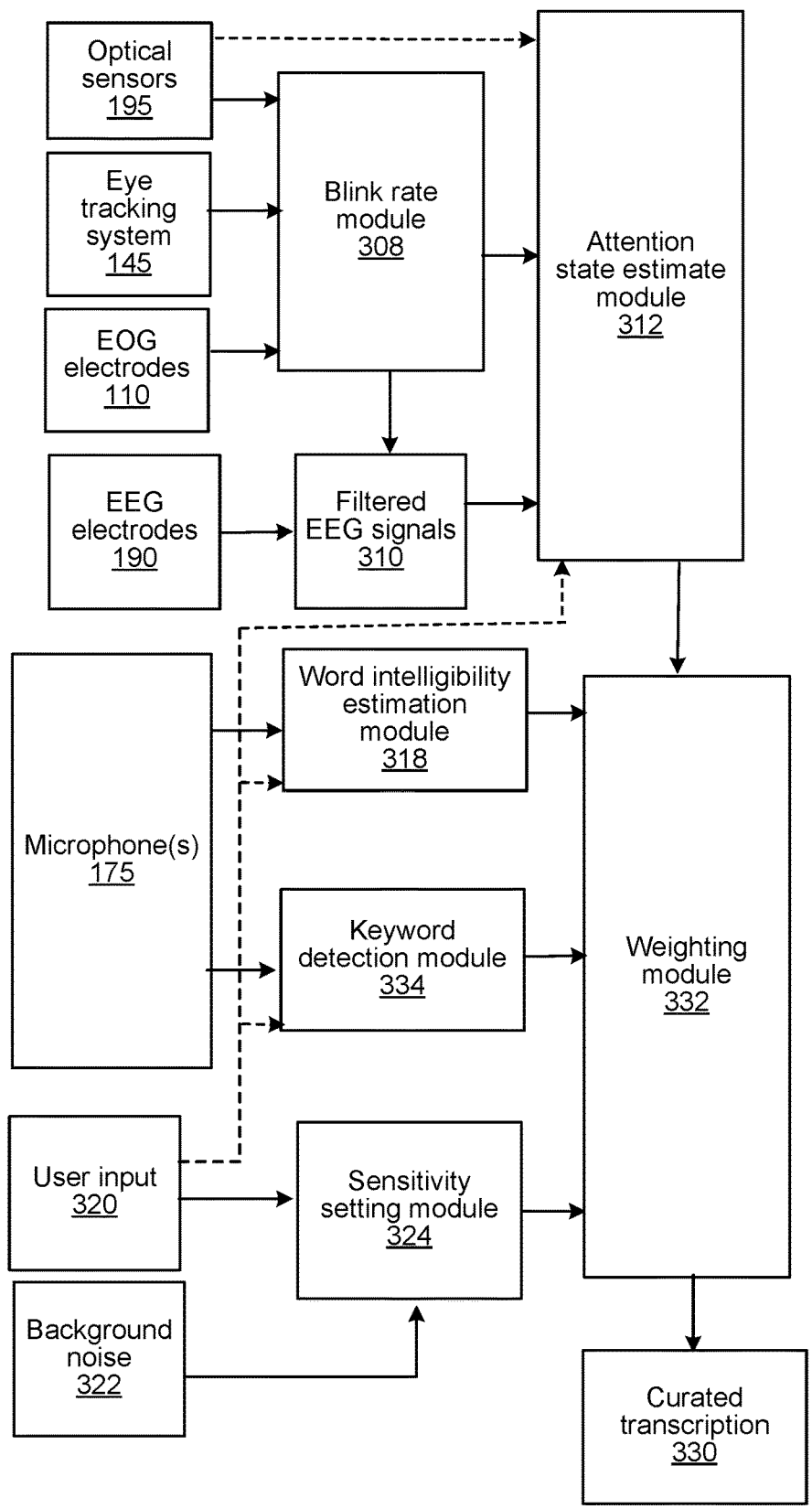
FIG. 3 illustrates a technique for determining a personalized and curated transcription of an auditory experience, according to various embodiments.

FIG. 3 illustrates a technique for determining a personalized and curated transcription of an auditory experience, according to various embodiments. The technique illustrated in FIG. 3 can be implemented, at least in part, using the transcription engine 185. Portions of the illustrated technique can also be implemented in conjunction with the application store 160 and various components comprised within the NED 105.

As shown, EOG electrodes 110, eye tracking system 145, and optical sensors 195, discussed in conjunction with FIG. 1, generate multi-modal signals that are input to the blink rate module 308. It should be noted that the EOG electrodes 110 and optical sensors 195 may overlap, partially or completely, with various components of the eye tracking system 145. The blink rate module 308 estimates (measures) the user's blink rate, pupil dilation, gaze steadiness, gaze acceleration in addition to other eye-tracking biomarkers. A biomarker is a descriptor or measure of a biological system. Biomarkers include obvious measures such as blood pressure, body temperatures, or heart rate, and also, less obvious measures, such as hair color, brain wave activity, eye gaze or blink rate.

The EEG electrodes 190 capture EEG signal data, which defines a waveform over time that represents the electrical activity that is taking place within the brain of the user. As noted above, the strength of the user's alpha and theta brain waves and the fluctuations in these waves provide information regarding the user's attentional state. However, the signals from the EEG electrodes 190 need to be filtered to generate filtered EEG signals 310 prior to using the signals to estimate the user's attentional state. As explained previously, the EOG signals from the EOG electrodes 110 can be used to filter the signals from the EEG electrodes 190 and remove any distortions.

In some embodiments, the attention state estimation module 312 estimates an attentional state of a user using multimodal inputs, in particular, the filtered EEG signals 310 and the biomarkers from the blink rate module 308 as input. An attentional state of a user can be estimated using a quantitative or numeric value computed (based on the various biomarkers) that measures an ability of a user to focus on a spoken word. In some embodiments, the signals from the optical sensors 195 can be directly inputted into the attention state estimation module 312. As discussed above, the optical sensors 195 can comprise an fNIRS system, where the signals from an fNIRS device can be used to estimate a cognitive load (e.g., listening effort, listener's intent, and the like) of the user. Accordingly, signals from the optical sensors 195 are input into the attention state estimation module 312, which can condition the signal (e.g., using an EEG signal to filter out fNIRS signal data to separate our neural signals representing brain activity from noise) to determine a user's cognitive load. The user's cognitive load as determined by the attention state estimation module 312 can be one of the factors evaluated in determining a user's attentional state. In one embodiment, the attention estimation module 312 assigns a metric or numeric value to an estimate of the cognitive load experienced by the user.

In some embodiments, a numeric value between "0" and "1.0" is computed that corresponds to the user's attentional state (and/or cognitive load experienced by the user), where "0" indicates that the subject is completely inattentive and "1.0" indicates that the subject is fully attentive. In some embodiments, this numeric value can be assigned to each word in a particular segment of a recording. Because the user's attentional state likely stays constant for a given period of time, in other embodiments, the computed numeric value can be assigned to a segment of a recording as a whole. It should be noted that the numeric value is not limited to any particular range of values. Furthermore, any other metric may also be computed by the attention state estimation module 312 to track a user's attentional state.

In some embodiments, the attention state estimation module 312 comprises a machine learning model (not shown in FIG. 3) that includes a pre-trained model that is used to quantify a user's attentional state and assign a numeric value within a given range. For example, the machine learning model is trained to assign a value between "0" and "1.0" to a subject's attentional state, where "0" indicates that the subject is completely inattentive and "1.0" indicates that the subject is fully attentive. For example, the machine learning model may include one or more recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs, and/or other types of artificial neural networks or components of artificial neural networks. Machine learning model may also, or instead, include a regression model, support vector machine, decision tree, random forest, gradient-boosted tree, naïve Bayes classifier, Bayesian network, Hidden Markov model (HMM), hierarchical model, ensemble model, clustering technique, and/or another type of machine learning model that does not utilize artificial neural network components.

In some embodiments, the machine learning model can be trained using sensor readings (e.g., EOG, EEG, optical sensor readings) from a multitude of users in various states of attentiveness. Using machine learning techniques, the model can learn which of the signals from the various sensors is most directly correlated with a user's attentiveness and needs to be weighted more heavily relative to the other signals in determining the attentional state. The model can also determine an ideal weighting between the various sensor inputs for computing a value for the attentional state of the user (e.g., between "0" and "1.0").

The microphone 176 captures an acoustic experience in the vicinity of the NED 105 and, in particular, any dialogue or spoken words that are part of the acoustic experience. The signals capturing the acoustic experience from the microphone 176 are directed to a word intelligibility estimation module 318. In some embodiments, the word intelligibility estimation module 318 comprises a classification system for determining how intelligible a spoken word is, as perceived by a user of the NED 105. The determination, in some embodiments, may be performed based on an audibility estimation method, for example, the Speech Intelligibility Index. The Speech Intelligibility Index (SII) is a standardized measure, ranging between "0.0" and "1.0" that is highly correlated with the intelligibility of speech. An SII of "0" implies that none of the speech information, in a given setting, is available (audible and/or usable) to improve speech understanding. An SII of "1.0" implies that all the speech information in a given setting is both audible and usable for a listener. The word intelligibility estimation module 318 is not limited to using SII and any other technologies for computing the intelligibility of words spoken in a dialogue captured by the microphone 176 can be used.

In some embodiments, any system that can perform an audibility estimation based on acoustic signal-to-noise (SNR) ratio (e.g., an energy ratio of the acoustic energy of the spoken words versus the background sound) can be used. The intelligibility of a given spoken word can be determined based on an audibility estimation method that relies on the SNR associated with the word.

Similar to the attention state estimation module 312, in some embodiments, a numeric value between "0" and "1.0" can be assigned to each word in a recording depending on the intelligibility of the word. Because the intelligibility of the speech likely stays constant for given segments of time, in other embodiments, the computed numeric value can be assigned to a segment of a recording as a whole. It should be noted that the numeric value is not limited to any particular range of values. Furthermore, any other metric may also be computed by the word intelligibility estimation module 318 to track speech intelligibility.

The signals capturing the auditory experience from the microphone 176 are also directed to a keyword detection module 334. The keyword detection module 334 estimates how important a given word is in the context of the captured conversation. In other words, the keyword detection module 334 determines whether a given word is salient enough in the context of the conversation to be considered a "keyword." In some embodiments, a score between 0 to 1 may be attributed to each word, where a score of "0" indicates that a word is extraneous in the context of the conversation and "1" indicates that the word is critical in the context of the conversation. In some embodiments, each word is assigned a metric or numeric value that indicates how critical that word is in the context of the conversation. The context of the conversation, in some embodiments, may be determined by analyzing words that are proximate to the word being evaluated. It should be noted that the numeric value is not limited to any particular range of values. Also, any other metric may also be computed by the keyword detection module 334 to determine whether a word is critical in the context of a conversation.

In some embodiments, the keyword detection module 334 comprises a machine learning model (not shown in FIG. 3) that includes a pre-trained model that is used to quantify an importance of a given word within the context of the captured speech and assign a numeric value within a given range (e.g., between "0" and "1.0" as explained above). For example, the machine learning model may include one or more recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs, and/or other types of artificial neural networks or components of artificial neural networks. Machine learning model may also, or instead, include a regression model, support vector machine, decision tree, random forest, gradient-boosted tree, naïve Bayes classifier, Bayesian network, Hidden Markov model (HMM), hierarchical model, ensemble model, clustering technique, and/or another type of machine learning model that does not utilize artificial neural network components.

In some embodiments, the keyword detection module 334 comprises a machine learning model that uses a tool similar to ChatGPT, wherein the ChatGPT selects the keywords from the conversation or evaluates each word separately and assigns a score between "0" and "1.0" to each word. Alternatively, any other metric may be used by the ChatGPT tool to evaluate the importance of a word in context.

The weighting module 332 analyzes the inputs (e.g., numeric values or scores for each word or segments of words) from the attention estimation module 312, the keyword detection module 334 and the word intelligibility estimation module 318 to determine the relevant keywords to display as part of the personalized and curated transcription on display 125. While the attention estimation module 318 makes a determination based on biomarkers gathered from the user's anatomy, the word intelligibility estimation module and the keyword detection module 334 analyze signals received external to the user (e.g., from acoustical microphone recordings of speech in the vicinity of the user). Relevance for each word is determined based on an analysis and weighting of all three inputs from modules 312, 334 and 318.

The weighting module 332 selects the words that will be selectively rendered on the display 125 as part of a curated transcription 330 in instances when words are likely to be unintelligible based on acoustics (e.g., as determined by the output of the word intelligibility estimation module 318) and/or when the user appears inattentive (e.g., as determined based on the output of the attention state estimation module 312) and/or the when keywords are uttered (e.g., as determined based on the output of the keyword detection module 334). The words selected for display will depend on the weight assigned to each of modules 312, 318 and 334.

In some embodiments, the weighting comprises computing a metric or numeric value for each word based on the numeric readings extracted from each of attention estimation module 312, the keyword detection module 334 and the word intelligibility estimation module 318. For example, a weighted value may be computed based on the numeric readings (e.g., the numeric readings between "0" and "1.0" computed for each of the modules 312, 334 and 318) and compared to a predetermined threshold. If the weighted value is higher than the threshold value, the word is displayed on the display 125. If the weighted value is, however, lower than the threshold value, the word is either de-emphasized or omitted from the curated transcription. It should be noted that the numeric values assigned by the weighting module 332 is not limited to any particular range of values. Furthermore, the weighting module 332 may use any other metric to weight between the various inputs.

The weighting module 332 can use one of several different methods to determine the weight to be assigned to each of the inputs. In one embodiment, a regression analysis or similar statistical approach can be used to determine how to weigh each of the inputs in a way that optimizes engagement for a particular user. For example, a regression analysis can be used to determined the weighted value that is compared with the predetermined threshold.

Instead of prescribing a standard weighting for all users, the weighting module 332 can be configured to alter the weights depending on the user. For example, if the biomarkers or the EEG signals for a particular user indicate that the user is distracted, the weighting module 332 may assign a higher weight to the signals from the attention state estimation module 312, which may have the effect of being overinclusive with words when generating the curated transcription (and including words even if they are not determined to be keywords by the keyword detection module 334 and even where the SNR reading for the words is high enough for the words to be intelligible). In other words, the weighting module 332 can be configured to give preference to readings from one of the modules 318, 332, and 312 based on subjective characteristics of the user or various other characteristics of the sound environment.

In some embodiments, the weighting module 332 comprises a machine learning model (not shown in FIG. 3) that includes a pre-trained model that is trained to determine an optimal balance between the various signal inputs. For example, the machine learning model may include one or more recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs, and/or other types of artificial neural networks or components of artificial neural networks. Machine learning model may also, or instead, include a regression model, support vector machine, decision tree, random forest, gradient-boosted tree, naïve Bayes classifier, Bayesian network, Hidden Markov model (HMM), hierarchical model, ensemble model, clustering technique, and/or another type of machine learning model that does not utilize artificial neural network components. The machine learning model is used by the weighting module 332 to determine a personalized and unique weighting for each user.

In some embodiments, a user can optionally control the weighting assigned to each of the attention state estimation module 312, the word intelligibility estimation module 318, and the keyword detection module 334 via user input 320. User input 320 to the sensitivity setting module 324 allows the user to override the default parameters used by the weighting module 332. For example, if the user is in a noisy environment, the user can manually increase the weighting attributed to the word intelligibility estimation module 318. Or if the user is suffering from a lack of focus, the user may dial down the attention threshold for the attention state estimation module 312 so that more words are included in the transcription.

The sensitivity setting module 324 allows control over the weighting module 332. The sensitivity setting module 324 can allow the user to increase the sensitivity of the weighting module 332 to certain inputs over others. For example, if the user is in a classroom listening to a lecture replete with unfamiliar terms, the sensitivity to the keyword detection module 334 may be increased, so that the weighting module 332 is overinclusive with words that are determined to be keywords.

In some embodiments, the sensitivity setting module 324 can be configured to automatically prompt the weighting module 332 to adjust the weights. As shown in FIG. 3, the background noise 322 is a separate input into a sensitivity setting module 324. For example, where the intensity of the background noise 322 crosses a given threshold, the sensitivity setting module 324 can be configured to automatically increase the weight assigned to the word intelligibility estimation module 318. In this instance, for example, the SNR threshold used by module 318 may be increased so that any word below the given SNR threshold may be designated to be displayed on display 125 as part of the curated transcription.

In some embodiments, the curated transcription 330 comprises only those words that the weighting module 332 determines meets the criteria established by the weighting module 332, while the rest of the words not determined to be relevant are omitted. In some embodiments, the curated transcription 330 comprises a verbatim transcript, where the keywords are highlighted or bolded in a way to draw the user's attention while the words that are not determined to be keywords are de-emphasized.

Figure 4:
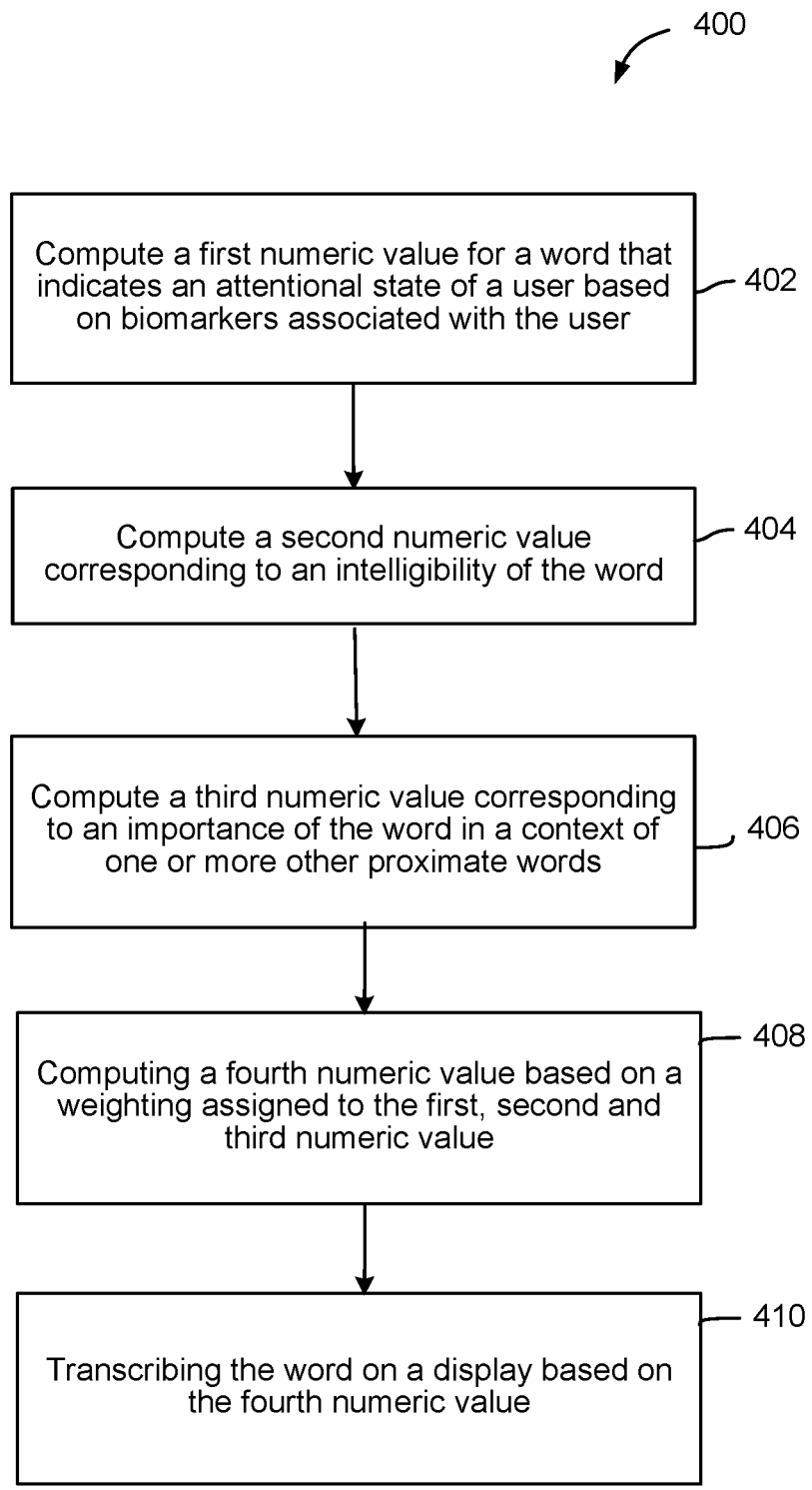
FIG. 4 is a flow diagram of method steps for developing a curated transcription of an acoustic experience, according to various embodiments.

FIG. 4 is a flow diagram of method steps for developing a curated transcription of an acoustic experience, according to various embodiments. Although the method steps are described with reference to the systems of FIGS. 1-3, persons skilled in the art will understand that any system may be configured to implement the method steps, in any order, in other embodiments.

As shown, a method 400 begins at step 402, where the attention state estimation module 312 computes a first metric or numeric value for a spoken word in an auditory experience (e.g., a conversation) that indicates an attentional state of a user based on biomarkers associated with the user. As noted previously, in some embodiments, EEG/EOG signals and other signals collected from various sensors connected to or disposed on an NED system are used to determine a user's attentional state. The biomarkers can include the user's blink rate, pupil dilation, gaze steadiness, gaze acceleration, strength of the user's alpha and theta brain waves, or other biomarkers collected from one or more of the EEG electrodes 190, EOG electrodes 110, the eye tracking system 145 and the optical sensors 195.

At step 404, the word intelligibility estimation module 318 computes a second metric or numeric value that corresponds to an intelligibility of the spoken word. The determination, in some embodiments, can be performed based on an audibility estimation method, for example, the Speech Intelligibility Index although other SNR-based methods can also be used.

At step 406, the keyword detection module 318 computes a a third metric or numeric value that corresponds to an importance of the word in a context of one or more other proximate words in the conversation. The third metric or numeric value can be used to determine if the word is a keyword within the context of the conversation. In some embodiments, a machine learning model is used to determine if the word is a keyword and assign the numeric score to the word.

At step 408, weighting module 332 weights between the first, second and third metrics or numeric value to determine a fourth metric or numeric value. As noted above, the weighting module 332 of FIG. 3 analyzes the inputs from the attention estimation module 312, the keyword detection module 334 and the word intelligibility estimation module 318 to determine the relevant keywords for display as part of the personalized and curated transcription on display 125. In some embodiments, the weighting may be performed using a regression analysis or a similar statistical approach. In some embodiments, the weighting is performed using a trained machine learning model.

At step 410, the fourth metric or numeric value is used to determine whether or not to transcribe the word for display on a display device (e.g., on a NED display) as part of a curated and personalized transcription presented to the user that takes into account the user's attentional state, the intelligibility of the word and how important the word is within the context of the auditory experience. For example, the fourth metric or numeric value can be compared to a threshold value to determine if a particular word should be displayed.

In sum, a transcription engine is configured to intelligently allocate cognitive load across the visual and auditory domains by providing a personalized and curated transcription of a conversation to a user on a display screen (e.g., on a display for a NED). The transcription shows only those keywords on the display that are determined to be relevant to a user while omitting or de-emphasizing words that are not determined to be relevant. Relevancy can be determined based on a combination of one or more of the following factors: a) a determination of how intelligible a particular spoken word is for a user (e.g., using an audibility estimation method such as the speech intelligibility index); b) an estimation of the importance of the word in the context of the conversation (e.g., using a machine learning model); and c) a determination of the user's attentional state using a variety of biomarkers (e.g. (i) estimation of blink rate, pupil dilation, gaze steadiness and gaze acceleration obtained from sensors positioned on the NED or on a user's face; (ii) EEG signals estimating the strength and/or fluctuations of a user's alpha and theta waves obtained using sensors disposed on the NED or on the user's anatomy). In some embodiments, a user is allowed to control the weight or sensitivity to be assigned to each of the factors (a), (b) and (c).

At least one advantage of the disclosed techniques is that users of the personalized speech-to-text transcription system can rely on the curated transcription to grasp certain spoken words during an auditory experience that were not perceived auditorily by the user. By personalizing and curating the transcription based on cues gathered from both the spoken words and the user, the transcription system not only improves user engagement, it also prevents the user from getting overwhelmed by a verbatim transcription of the auditory experience. By relying on cues from the user (e.g., physiological cues to determine the user's attentional state), the transcription is also selectively curated for each individual user, which further improves user engagement. Accordingly, the disclosed techniques represent a technological advancement compared to prior approaches that transcribe conversations in their entirety resulting in low user engagement.

Any and all combinations of any of the claim elements recited in any of the claims and/or any elements described in this application, in any fashion, fall within the contemplated scope of the present embodiments and protection.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

1. A computer-implemented method, comprising: computing a first metric for a word, the first metric indicating an attentional state of a user perceiving the word during an auditory experience, wherein the first metric is computed based on biomarkers associated with the user; computing a second metric corresponding to an intelligibility of the word during the auditory experience; computing a third metric corresponding to an importance of the word in a context of one or more words uttered in proximate to the word during the auditory experience; and based on a weighting assigned to each of the first metric, second metric and third metric, computing a fourth metric; and determining whether to transcribe the word for display based on the fourth metric.

2. The computer-implemented method of clause 1, wherein the fourth metric is used to determine whether to transcribe the word for display by comparing it with a predetermined threshold value, and wherein the word is displayed on the display if the fourth metric is above the predetermined threshold value.

3. The computer-implemented method of clauses 1 and 2, wherein the display is comprised within a near-eye display (NED) system operating in an artificial reality environment.

4. The computer-implemented method of any of clauses 1, 2, and 3, wherein the biomarkers include one or more of a blink rate, pupil dilation, gaze steadiness or a gaze acceleration.

5. The computer-implemented method of any of clauses 1, 2, 3 and 4, wherein the biomarkers are computed using signals from one or more sensors including an electroencephalography (EEG) electrode, an electrooculography (EOG) electrode, a functional near-infrared spectroscopy (fNIRS) optode, and a multi-wavelength photoplethysmography (MW-PPG) sensor.

6. The computer-implemented method of any of clauses 1, 2, 3, 4, and 5, wherein the first metric, the second metric and the third metric range between 0 and 1.

7. The computer-implemented method of any of clauses 1, 2, 3, 4, 5, and 6, wherein computing the second metric corresponding to the intelligibility of the word comprises estimating an audibility of the word using a signal-to-noise (SNR) ratio associated with the word.

8. The computer-implemented method of any of clauses 1, 2, 3, 4, 5, 6, and 7, wherein computing the third metric corresponding to the importance of the word comprises using a machine learning model to determine the importance of the word, wherein the machine learning model comprises one of a recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs.

9. The computer-implemented method of any of clauses 1, 2, 3, 4, 5, 6, 7, and 8, wherein an assignment of the weighting comprises using a machine learning model to determine an optimal weighting, wherein the machine learning model comprises one of a recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs.

10. The computer-implemented method of any of clauses 1, 2, 3, 4, 5, 6, 7, 8, and 9, wherein an assignment of the weighting comprises is performed using a regression analysis.

11. The computer-implemented method of any of clauses 1, 2, 3, 4, 5, 6, 7, 8, 9, and 10, wherein the weighting is selectively assigned by the user.

12. The computer-implemented method of any of clauses 1, 2, 3, 4, 5, 6, 7, 8, 9, 10, and 11, wherein an assignment of the weighting is based on a combination of automated and user-based selections.

13. One or more non-transitory computer-readable media storing instructions that, when executed by one or more processors, cause the one or more processors to perform the steps of: computing a first metric for a word, the first metric indicating an attentional state of a user perceiving the word during an auditory experience, wherein the first metric is computed based on biomarkers associated with the user; computing a second metric corresponding to an intelligibility of the word during the auditory experience; computing a third metric corresponding to an importance of the word in a context of one or more proximate words during the auditory experience; and based on a weighting assigned to each of the first metric, the second metric and the third metric, computing a fourth metric; and determining whether to transcribe the word for display based on the fourth metric.

14. The one or more non-transitory computer-readable media of clause 13, wherein the fourth metric is used to determine whether to transcribe the word on the display by comparing is with a predetermined threshold value, and wherein the word is displayed on the display if the fourth metric is above the predetermined threshold value.

15. The one or more non-transitory computer-readable media of clauses 13 and 14, wherein the display is comprised within a near-eye display (NED) system operating in an artificial reality environment.

16. The one or more non-transitory computer-readable media of clauses 13, 14 and 15, wherein the biomarkers include one or more of a blink rate, pupil dilation, gaze steadiness or a gaze acceleration.

17. The one or more non-transitory computer-readable media of clauses 13, 14, 15 and 16, wherein the biomarkers are computed using signals from one or more sensors including an electroencephalography (EEG) electrode, an electrooculography (EOG) electrode, a functional near-infrared spectroscopy (fNIRS) optode, and a multi-wavelength photoplethysmography (MW-PPG) sensor.

18. A wearable device, comprising: one or more memories that store instructions, and one or more processors that are coupled to the one or more memories and, when executing the instructions, are configured to: compute a first metric for a word, the metric indicating an attentional state of a user perceiving the word during an auditory experience, wherein the metric is computed based on biomarkers associated with the user; compute a second metric corresponding to an intelligibility of the word during the auditory experience; compute a third metric corresponding to an importance of the word in a context of one or more proximate words during the auditory experience; and based on a weighting assigned to each of the first metric, the second metric and the third metric, compute a fourth metric; and determine whether to transcribe the word for display based on the fourth metric.

19. The wearable device of clause 18, wherein the display is comprised within a near-eye display (NED) system operating in an artificial reality environment.

20. The wearable device of clauses 18 and 19, wherein an assignment of the weighting and a computation of the third metric comprises using a machine learning model, wherein the machine learning model comprises one of a recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
    computing a first metric for a word, the first metric indicating an attentional state of a user perceiving the word during an auditory experience, wherein the metric is computed based on biomarkers associated with the user that are computed using signals from one or more sensors on a near-eye display system operating in an artificial reality environment;
    computing a second metric corresponding to an intelligibility of the word by estimating an audibility of the word using a signal-to-noise (SNR) ratio associated with the word during the auditory experience;
    computing a third metric corresponding to an importance of the word by using a machine learning model to determine the importance of the word in a context of a conversation during the auditory experience; and
    based on a weighting assigned to each of the first metric, second metric and third metric, computing a fourth metric; and
    determining whether to transcribe the word for display based on the fourth metric.

2. The computer-implemented method of claim 1, wherein the fourth metric is used to determine whether to transcribe the word for display by comparing it with a predetermined threshold value, wherein the word is displayed on the display if the fourth metric is above the predetermined threshold value.

3. The computer-implemented method of claim 1, wherein the biomarkers include one or more of a blink rate, pupil dilation, gaze steadiness or a gaze acceleration.

4. The computer-implemented method of claim 1, wherein the biomarkers are computed using signals from one or more sensors including an electroencephalography (EEG) electrode, an electrooculography (EOG) electrode, a functional near-infrared spectroscopy (fNIRS) optode, or a multi-wavelength photoplethysmography (MW-PPG) sensor.

5. The computer-implemented method of claim 1, wherein the first metric, the second metric and the third metric, each comprise a numeric value ranging between 0 and 1.

6. The computer-implemented method of claim 1, wherein the machine learning model to determine the importance of the word comprises one of a recurrent neural network (RNN), convolutional neural network (CNN), deep neural network (DNN), deep convolutional network (DCN), residual neural network (ResNet), graph neural network, autoencoder, transformer neural network, deep stereo geometry network (DSGN), or stereo R-CNN.

7. The computer-implemented method of claim 1, wherein an assignment of the weighting comprises using a machine learning model to determine an optimal weighting, wherein the machine learning model comprises one of a recurrent neural network (RNN), convolutional neural network (CNN), deep neural network (DNN), deep convolutional network (DCN), residual neural network (ResNet), graph neural network, autoencoder, transformer neural network, deep stereo geometry network (DSGN), or stereo R-CNN.

8. The computer-implemented method of claim 1, wherein an assignment of the weighting comprises performing a regression analysis.

9. The computer-implemented method of claim 1, wherein the weighting is selectively assigned by the user.

10. The computer-implemented method of claim 1, wherein an assignment of the weighting is based on a combination of automated and user-based selections.

11. The computer-implemented method of claim 1, wherein the signal-to-noise (SNR) ratio comprises an energy ratio of an acoustic energy of spoken words versus a background sound.

12. One or more non-transitory computer-readable media storing instructions that, when executed by one or more processors, cause the one or more processors to perform steps of:
    computing a first metric for a word, the metric indicating an attentional state of a user perceiving the word during an auditory experience, wherein the metric is computed based on biomarkers associated with the user that are computed using signals from one or more sensors on a near-eye display system operating in an artificial reality environment;
    computing a second metric corresponding to an intelligibility of the word by estimating an audibility of the word using a signal-to-noise (SNR) ratio associated with the word during the auditory experience;
    computing a third metric corresponding to an importance of the word by using a machine learning model to determine the importance of the word in a context of a conversation during the auditory experience; and
    based on a weighting assigned to each of the first metric, the second metric and the third metric, computing a fourth metric; and determining whether to transcribe the word for display based on the fourth metric.

13. The one or more non-transitory computer-readable media of claim 12, wherein the fourth metric is used to determine whether to transcribe the word for display by comparing is with a predetermined threshold value, wherein the word is displayed on the display if the fourth metric is above the predetermined threshold value.

14. The one or more non-transitory computer-readable media of claim 12, wherein the biomarkers include one or more of a blink rate, pupil dilation, gaze steadiness or a gaze acceleration.

15. The one or more non-transitory computer-readable media of claim 12, wherein the biomarkers are computed using signals from one or more sensors including an electroencephalography (EEG) electrode, an electrooculography (EOG) electrode, a functional near-infrared spectroscopy (fNIRS) optode, and a multi-wavelength photoplethysmography (MW-PPG) sensor.

16. The one or more non-transitory computer-readable media of claim 12, wherein the signal-to-noise (SNR) ratio comprises an energy ratio of an acoustic energy of spoken words versus a background sound.

17. A wearable device, comprising:
one or more memories that store instructions, and
one or more processors that are coupled to the one or more memories and, when executing the instructions, are configured to:
compute a first metric for a word, the metric indicating an attentional state of a user perceiving the word during an auditory experience, wherein the metric is computed based on biomarkers associated with the user that are computed using signals from one or more sensors on a near-eye display system operating in an artificial reality environment;
compute a second metric corresponding to an intelligibility of the word by estimating an audibility of the word using a signal-to-noise (SNR) ratio associated with the word during the auditory experience;
compute a third metric corresponding to an importance of the word by using a machine learning model to determine the importance of the word in a context of a conversation during the auditory experience; and
based on a weighting assigned to each of the first metric, the second metric and the third metric, compute a fourth metric; and
determine whether to transcribe the word for display based on the fourth metric.

18. The wearable device of claim 17, wherein the display is comprised within a near-eye display (NED) system operating in an artificial reality environment.

19. The wearable device of claim 17, wherein the machine learning model to determine the importance of the word comprises one of a recurrent neural networks (RNNs), convolutional neural networks (CNNs), deep neural networks (DNNs), deep convolutional networks (DCNs), residual neural networks (ResNets), graph neural networks, autoencoders, transformer neural networks, deep stereo geometry networks (DSGNs), stereo R-CNNs.

20. The wearable device of claim 17, wherein the signal-to-noise (SNR) ratio comprises an energy ratio of an acoustic energy of spoken words versus a background sound.

* * * * *